US012675005B2

(12) United States Patent
Pau et al.

(10) Patent No.: US 12,675,005 B2
(45) Date of Patent: Jul. 7, 2026

(54) ADJUSTABLE FULL STOKES POLARIZATION EYEWEAR

(71) Applicant: Arizona Board of Regents on Behalf of the University of Arizona, Tucson, AZ (US)

(72) Inventors: Stanley Pau, Tucson, AZ (US); Russell Chipman, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 971 days.

(21) Appl. No.: 17/764,081

(22) PCT Filed: Sep. 25, 2020

(86) PCT No.: PCT/US2020/052883
§ 371 (c)(1),
(2) Date: Mar. 25, 2022

(87) PCT Pub. No.: WO2021/062275
PCT Pub. Date: Apr. 1, 2021

(65) Prior Publication Data
US 2022/0350173 A1 Nov. 3, 2022

Related U.S. Application Data

(60) Provisional application No. 62/906,386, filed on Sep. 26, 2019.

(51) Int. Cl.
G02C 7/12 (2006.01)
G02C 11/00 (2006.01)

(52) U.S. Cl.
CPC ................ G02C 7/12 (2013.01); G02C 11/10 (2013.01)

(58) Field of Classification Search
CPC ......... G02C 7/12; G02C 11/10; G02B 27/281
See application file for complete search history.

(56) References Cited

U.S. PATENT DOCUMENTS 5,355,183 A 10/1994 Andrea
5,396,329 A * 3/1995 Kalawsky .............. G02B 27/28
250/225

(Continued)

FOREIGN PATENT DOCUMENTS

CN 202306015 U 7/2012

OTHER PUBLICATIONS

Tu, Xingzhou, et al., "Design, fabrication and testing of achromatic elliptical polarizer," Optics Express 25, 10355, 2017.

(Continued)

*Primary Examiner* — William R Alexander
*Assistant Examiner* — Gabriel A Sanz
(74) *Attorney, Agent, or Firm* — Perkins Coie

(57) ABSTRACT

Devices, methods and systems related to an adjustable polarization filter assembly are described that can be implemented as part of an eyewear or another viewing device to provide the ability to tune the polarization of light that is received based on user and environmental inputs. One example device includes a first rotatable polarization filter that is configured to change a polarization of the incident light, and a second rotatable polarization filter that is also configured to rotate and modify a polarization of light that is incident thereon. The two filters together, via rotation of the first and the second filters, can block any eigenpolarization state on a Poincaré sphere and transmit an orthogonal polarization state. The described devices provide improved viewing capability in different environmental conditions, such as under water, in haze or fog, in outdoor and indoor environments, and in day and night times.

21 Claims, 8 Drawing Sheets

200

Side View

(56)       References Cited

U.S. PATENT DOCUMENTS

| 6,765,640 | B1 * | 7/2004 | Acosta | G02F 1/13363 |
| | | | | 349/98 |
| 9,778,491 | B2 | 10/2017 | Rinella | |
| 2007/0139519 | A1 * | 6/2007 | DeCusatis | H04N 13/398 |
| | | | | 348/E13.058 |
| 2007/0296912 | A1 | 12/2007 | Szejnwald | |
| 2010/0053544 | A1 | 3/2010 | Beasley | |
| 2011/0032477 | A1 * | 2/2011 | Ohanesian | G02C 7/081 |
| | | | | 351/159.58 |
| 2011/0199680 | A1 * | 8/2011 | Saylor | G02C 7/086 |
| | | | | 359/465 |
| 2014/0327870 | A1 * | 11/2014 | Chow | G02C 7/12 |
| | | | | 351/159.56 |
| 2016/0026007 | A1 * | 1/2016 | Rinella | G02C 7/12 |
| | | | | 351/47 |
| 2017/0146825 | A1 | 5/2017 | Nottage | |
| 2020/0029050 | A1 * | 1/2020 | Antunes | H04N 23/667 |
| 2020/0300615 | A1 * | 9/2020 | Andrews | G01J 4/02 |

OTHER PUBLICATIONS

International Search Report and Written Opinion for PCT/US2020/052883.

* cited by examiner

200

201

202

203

204

206

205

207

Side View

500

501

502

502

503

503

504

506

505

Side View

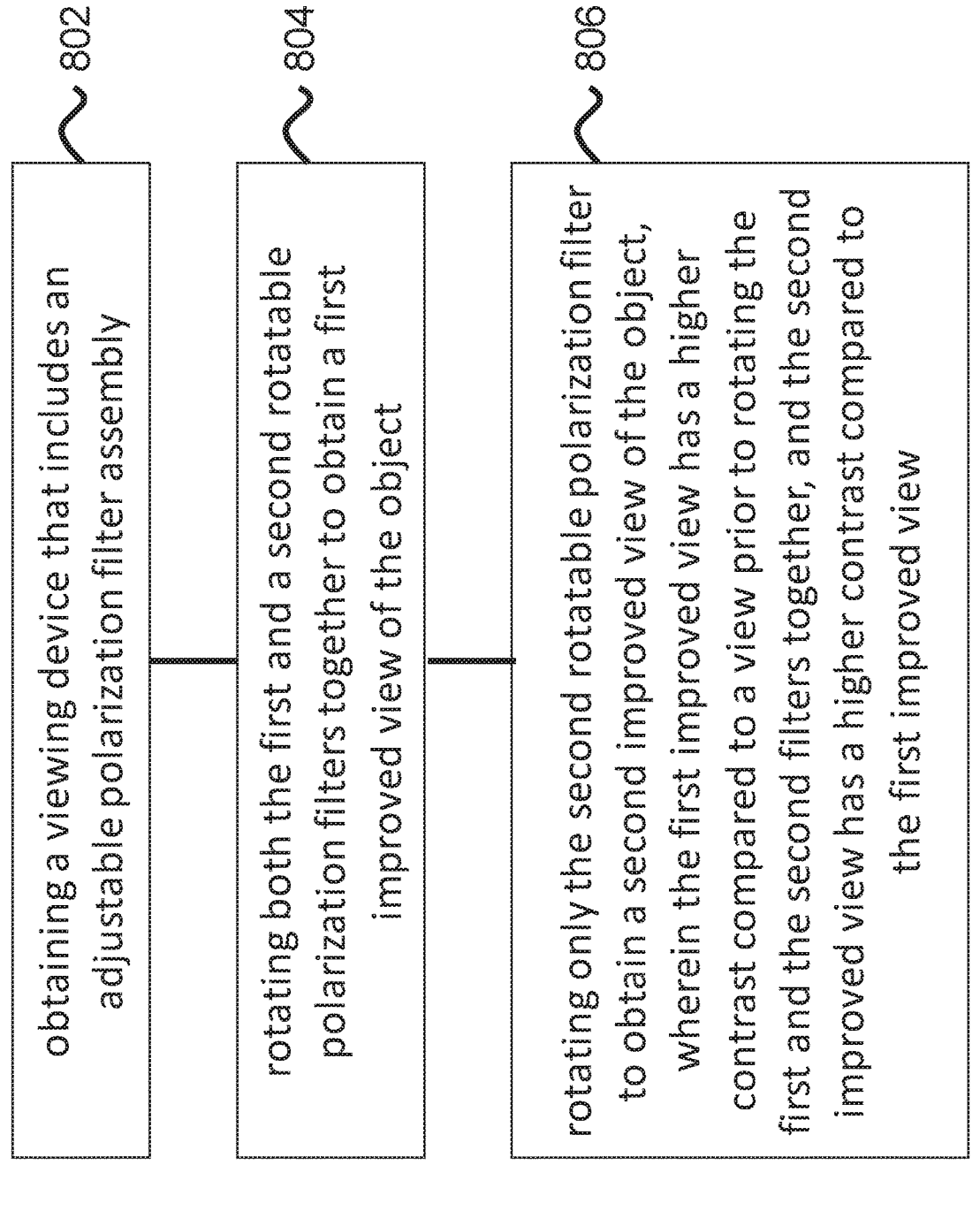

802 obtaining a viewing device that includes an adjustable polarization filter assembly

804 rotating both the first and a second rotatable polarization filters together to obtain a first improved view of the object

806 rotating only the second rotatable polarization filter to obtain a second improved view of the object, wherein the first improved view has a higher contrast compared to a view prior to rotating the first and the second filters together, and the second improved view has a higher contrast compared to the first improved view

ADJUSTABLE FULL STOKES POLARIZATION EYEWEAR

CROSS-REFERENCE TO RELATED APPLICATION(S)

This patent document is a 371 National Phase Application of International Patent Application No. PCT/US2020/052883, filed Sep. 25, 2020, which claims priority to the provisional application with Ser. No. 62/906,386, titled "Adjustable Full Stokes Polarization Eyewear," filed Sep. 26, 2019. The entire contents of the above noted applications are incorporated by reference as part of the disclosure of this document for all purposes.

TECHNICAL FIELD

The disclosed technology relates generally to optical devices and more specifically to optical devises and associated methods for associated methods for tuning the polarization of light as part of an eyewear.

BACKGROUND

Polarization is a property of light. The polarization state can be linear, elliptical and circular. Linear polarizers are often used in conventional eyewear to increase contrast and to reduce reflections in order to improve the viewability of objects. In general, the purpose of the polarizer is to separate a polarized component of the signal from the background. Existing eyewear that are equipped with polarizers cannot completely filter out the diversity of different polarized light that can depend on environmental factors, manufacturer preferences or other factors described above. Thus, there is a need for eyewear with improved performance.

SUMMARY

The disclosed embodiments relate to devices, methods and systems that can be implemented as part of an eyewear with the ability to tune the polarization of light that is received and passed through the eyewear based on user and environmental inputs. One aspect of the disclosed technology relates to an adjustable polarization filter assembly for use in an eyewear device that includes a first rotatable polarization filter configured to rotate around an optical axis of the eyewear device, where the first rotatable polarization filter is configured to change a polarization of light that is incident thereupon. The adjustable polarization filter assembly further includes a second rotatable polarization filter that is configured to rotate around the optical axis of the eyewear device and is positioned to receive light that passes through the first rotatable polarization filter and to modify a polarization of light that is incident thereupon. At least one of the first or the second rotatable polarization filters is an achromatic polarization retarder, and each of the first and the second rotatable polarization filters is rotatable independent of the other rotatable polarization filter such that the first and the second polarization filters together, via rotation of the first and the second rotatable polarization filters, is configurable to block any one of a plurality of eigenpolarization states on a Poincaré sphere and to transmit therethrough light having an orthogonal polarization state compared to the eigenpolarization state that is blocked.

BRIEF DESCRIPTION OF THE DRAWINGS

FIG. 8 illustrates a set of operations 800 that can be carried out or improved viewing of an object in accordance with an example embodiment.

DETAILED DESCRIPTION

The polarization state of light can be linear, elliptical or circular and can be described by a four-component vector called the Stokes vector, which includes the Stokes parameters. The four Stokes parameters are real-valued and are denoted by $S_0$, $S_1$, $S_2$, and $S_3$. They are defined by six polarized flux measurements using ideal polarizer.

$$S = \begin{bmatrix} S_0 \\ S_1 \\ S_2 \\ S_3 \end{bmatrix} = \begin{bmatrix} P_H + P_V \\ P_H - P_V \\ P_{45} + P_{135} \\ P_R + P_L \end{bmatrix}. \qquad \text{Eq. (1)}$$

Figure 1:
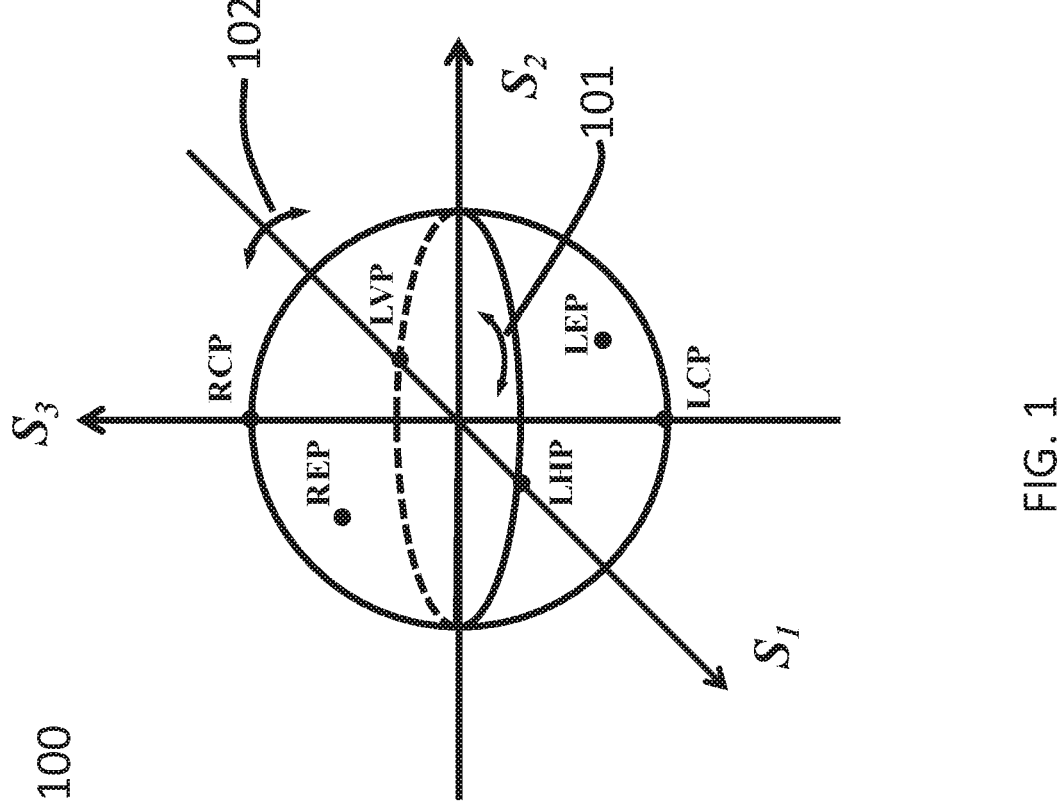
FIG. 1 illustrates the Poincaré sphere, depicting a graphical presentation of the Stokes vectors.

In Equation (1), $P_H$, $P_V$, $P_{45}$, $P_{135}$, $P_R$ and $P_L$ denote the horizontal linearly polarized, vertical linearly polarized, 45° linearly polarized, 135° linearly polarized, right circularly polarized and left circularly polarized flux measurements, respectively. Any polarization state can be represented as a point on the Poincaré sphere. FIG. 1 illustrates the Poincare sphere 100, depicting a graphical presentation of the Stokes vectors $S_1$, $S_2$, and $S_3$. Each point on the Poincaré sphere represents a unique polarization state of light. In this description, the north and south poles represent right-hand circular (RCP) and left-hand circularly (LCP) polarized light, respectively. AU points on the equator of the Poincaré sphere represent linear polarized light of different orientation angles. All points between the equator and the north pole represent right-hand elliptically polarized light (REP). AU points between the equator and the south pole represent left-hand elliptically polarized light (LEP).

An ideal polarizer has unity transmission for a predefined polarization state and zero transmission for a corresponding orthogonal polarization state. The two states are eigenpolarization states of the polarizer and can be represented as two diametrically opposite points on the Poincaré sphere. For example, RCP light is orthogonal to LCP light, and linear horizontally polarized (LHP) light is orthogonal to linear vertically polarized (LVP) light.

As noted earlier, conventional eyewear, such as sunglasses with linear polarizers, can extensively improve contrast and reduce reflections. Some glasses that made for viewing 3D displays are implemented using circular polarizers. While separating a polarized component of the signal from the background, polarizers ideally need to have low loss, wide field of view, high extinction ratio between orthogonal eigenpolarization states and large chromatic bandwidth. The performance of achromatic polarizers that include multiple layers of birefringent polymer depends on the polarization states of the illumination and the reflectivity of the visible objects.

Light in both indoor and outdoor environments can be polarized in different ways. For example, Fresnel reflection converts unpolarized light to linearly polarized light. Total internal reflection converts linearly polarized light to circularly and elliptically polarized light. The conversion efficiency is generally wavelength-dependent and also depends on the geometry, incident light polarization and surface properties of the object. Other sources of polarized light include Rayleigh scattering which converts unpolarized sunlight to linearly polarized light. In addition, many displays, such as liquid crystal displays and organic light emitting diode displays, emit polarized light. The polarization of light can further differ based on design choices made by device manufacturers. For example, cell phone displays from one manufacturer may emit linearly polarized light, while the displays from another manufacturer may produce circularly polarized light.

Existing eyewear based on a single type of polarizer (e.g., one or more linear polarizers) cannot completely filter out the diversity of different polarized light that can depend on environmental factors, manufacturer preferences or other factors described above. Thus, there is a need for a tunable eyewear with tunable eigenpolarization state which can be tuned and optimized to enhance the quality of the viewed images (e.g., images with improved contrast) under different environmental conditions and/or subjective user preferences.

Figure 2:
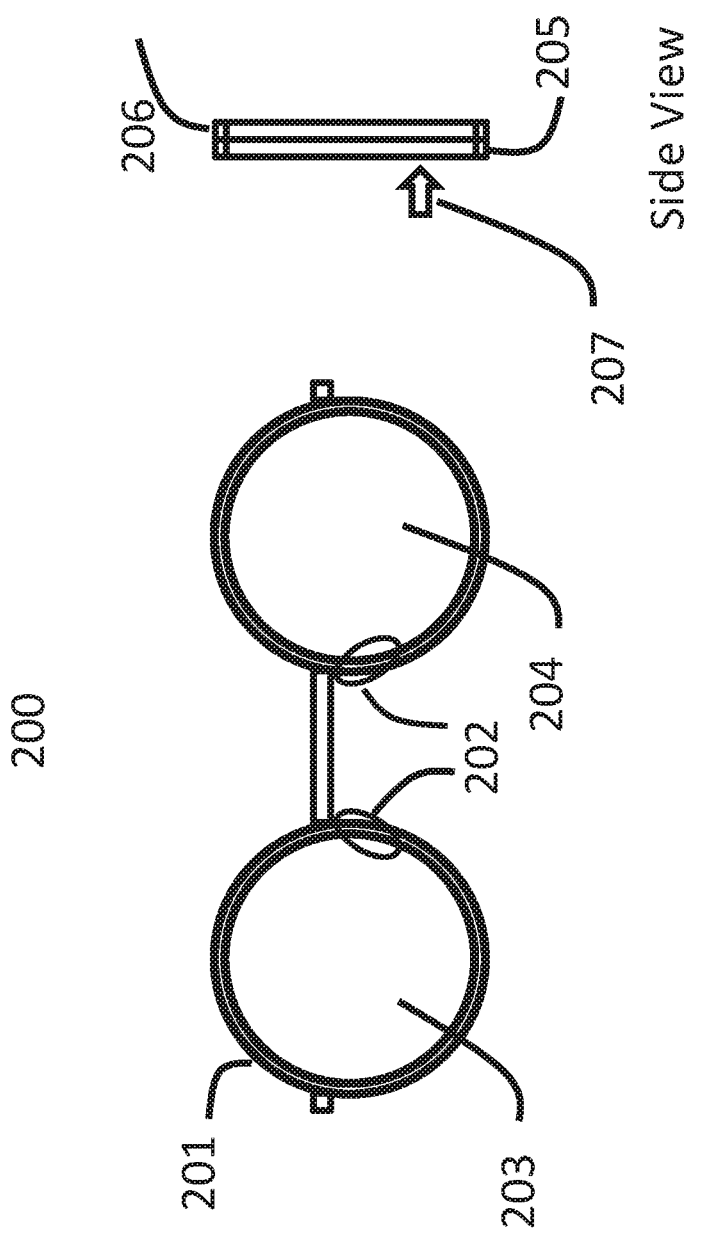
FIG. 2 illustrates a tunable full Stokes polarization eyewear in accordance with an example embodiment.

FIG. 2 shows a tunable full Stokes polarization eyewear in accordance with an example embodiment. The spectacle 200 includes a frame 201 connected to two nose pads 202. The spectacle 200 has two filters 203 and 204 for the right and left eyes, respectively. Note that in the illustrative diagram of FIG. 2, the filters 203 and 204 are shown as completely transparent filters to facilitate the presentation. It is, however, understood that the filters 203 and 204 can typically appear as colored filters. The filters 203 and 204 can be mounted on the frame 201 and can be rotated mechanically by hand to any arbitrary angle. The filter for each eye can be a two-layer filter, as illustrated by reference numbers 205 and 206 in the side-view illustration in FIG. 2, where the direction of incident light is illustrated by the arrow 207. Each of the filter layers 205 and 206 can be rotated independent of each other. In some example embodiments, the first filter layer 205 is an achromatic quarter wave plate and the second filter layer 206 is a broadband linear polarizer that covers the visible spectrum. The first filter layer can be more generally described as a retarder that changes the polarization state of the light. It should be noted that in this document the terms "filter layer" and "filter" are sometimes used interchangeably to identify one or more filters or filter components that modify a property of light that is incident thereon.

The eigenpolarization of the combined filter layers can be tuned to any point on the Poincaré sphere by rotation of the filter layers 205 and 206. For example, by rotating the linear polarizer (filter layer 206), any point on the equator of the Poincaré sphere can be reached as shown by the arrow 101 in FIG. 1. Rotation of the quarter wave plate (filter layer 205) changes the degree of circular polarization (DoCP) of the eigenpolarization state, as shown by the arrow 102 in FIG. 1. DoCP is defined in terms of the Stokes parameter using:

$$DoCP = \frac{S_3}{S_0}. \qquad \text{Eq. (2)}$$

The DoCP range is: $-1 \leq DoCP \leq 1$. Thus, by rotating the quarter wave plate 205 and the linear polarizer 206, any point on the top or bottom hemisphere of the Poincaré sphere can be reached.

In one example scenario, a user may be interested in viewing objects that are behind a window, which are not clearly viewable due to ambient light reflections from the window. In this example, the user, equipped with the disclosed eyewear, can tune the polarization state produced by the two filters 205 and 206 to block the reflected polarized ambient light and to allow the light from the object to reach the viewer's eyes with a larger contrast. For example, the user may initially rotate both filters 205 and 20 until an improved (or best) contrast is achieved. The user may then rotate the second filter 206 to further improve the contrast. In other example techniques, the filters 205 and 206 may be individually rotated in a sequential or iterative fashion to obtain the optimum or desired image quality. More broadly, in the above scenario, the best viewing condition may be achieved by rotating the filters to collectively block the undesired light by producing an eigenpolarization that is orthogonal to the polarization of the undesired light. In the context of the Poincaré sphere, orthogonal polarization states are formed on opposite sides of the sphere, at the two ends of each diagonal line that passes through the center of the Poincaré sphere. In the above example, the tuning was achieved manually, but as described below in further detail, the tuning can be carried out more precisely using automated motorized controls.

Figure 3:
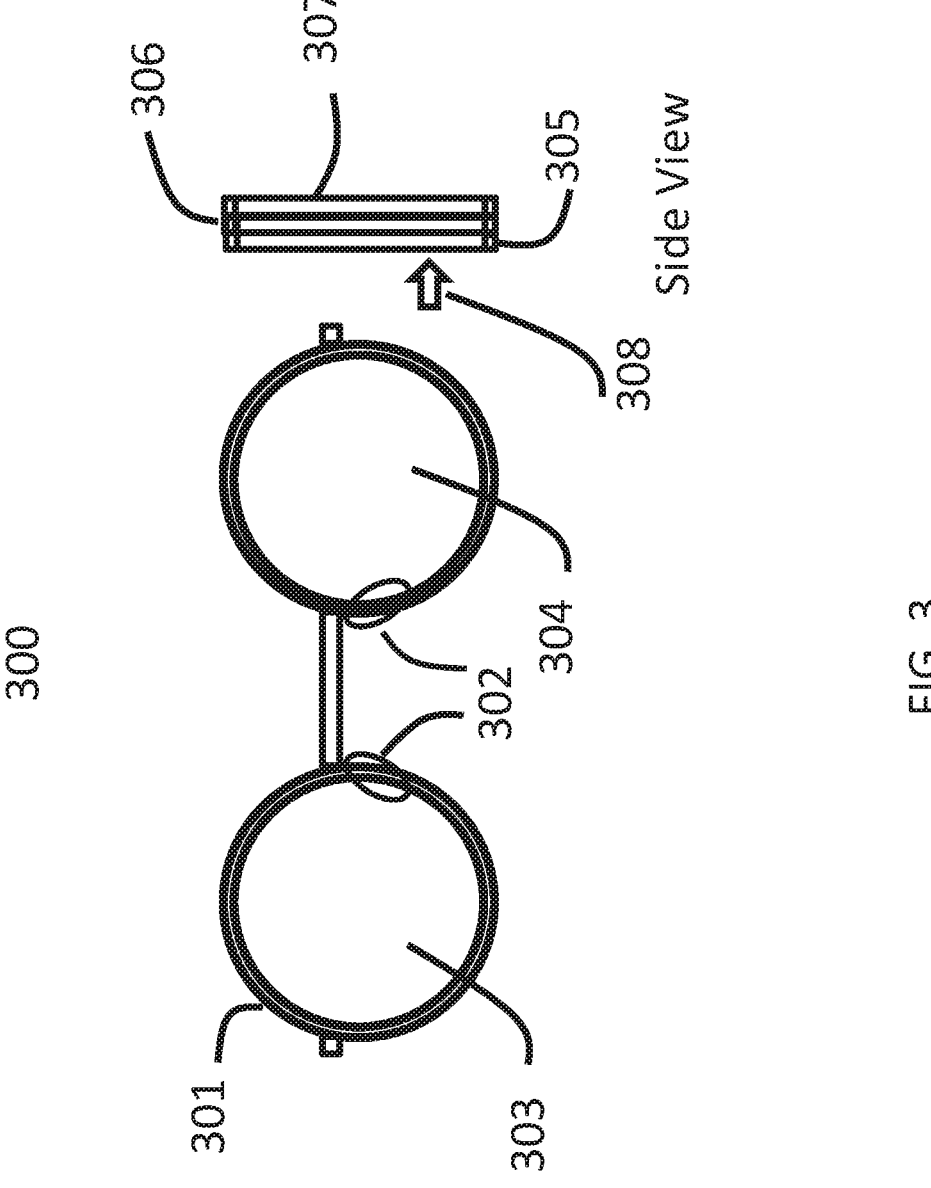
FIG. 3 illustrates an alternative embodiment of the disclosed technology that incorporates a tunable full Stokes polarization eyewear.

FIG. 3 illustrates an alternative embodiment of the disclosed technology that incorporates a tunable full Stokes polarization eyewear. The spectacle 300 includes a frame 301 connected to two nose pads 302. The spectacle 300 has two filters 303 and 304 for the right and left eyes, respectively. The filters are mounted on the frame and can be rotated mechanically by hand to any arbitrary angle. The filter for each eye includes three layers of filters, 305, 306 and 307. The direction of incident light is shown by arrow 308. In some embodiments, the layer 307 is fixed, whereas filter layers 305 and 306 can be rotated independent of each other. In some example embodiments, filter layer 305 is an achromatic quarter wave plate, filter layer 306 is an achromatic half wave plate and filter layer 307 is a broadband linear polarizer that covers the visible spectrum. In this configuration, the eigenpolarization of the combined filters can be tuned to any point on the Poincaré sphere. For example, by rotating the half wave plate (filter layer 306), any point on the equator of the Poincaré sphere can be reached as shown by the arrow 101 in FIG. 1. Rotation of the quarter wave plate (filter layer 305) changes the DoCP of the eigenpolarization state, as shown by the arrow 102 in FIG. 1. Thus, by rotating the quarter wave plate 305 and the half wave plate 306, any point on the top or bottom hemisphere of the Poincaré sphere can be reached. As discussed in connection with FIG. 2, a user may use different techniques to rotate the filter layers sequentially and/or iteratively to obtain the desired view quality. Compared to the configuration of FIG. 2, the three-layer configuration of FIG. 3 may provide a finer control and better granularity.

Figure 4:
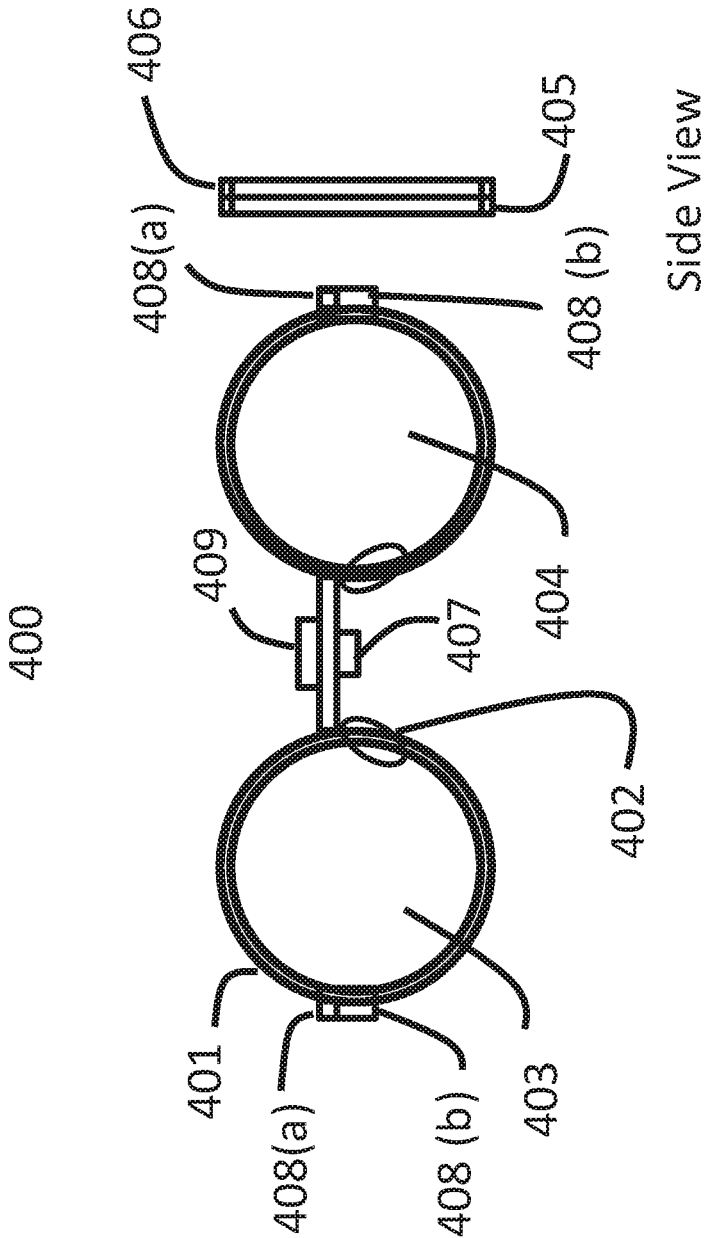
FIG. 4 illustrates another alternative embodiment of the disclosed technology that implements a tunable full Stokes polarization eyewear.

FIG. 4 illustrates another alternative embodiment of the disclosed technology that implements a tunable full Stokes polarization eyewear. The spectacle 400 includes a frame 401 connected to two nose pads 402. The spectacle 400 has two filters 403 and 404 for the right and left eyes, respectively. The filters are mounted on the frame and can be rotated by two motors 408(*a*) and 408(*b*) to any arbitrary angle. The filter for each eye includes two filter layers, 405 and 406, which can be rotated independent of each other. The motors can, for example, include a gear assembly that engages with an edge of the associated filters (or filter holders) to rotate each filter layer. In some embodiments, filter layer 405 is an achromatic quarter wave plate, filter 406 is a broadband linear polarizer that covers the visible spectrum. In addition, the spectacle 400 includes a polarization sensitive light detector 407 that is configured to receive light from the surroundings to determine certain polarization characteristics of the light. For example, the detector can be a point detector which measures the average Stokes parameter of the ambient light. The detector 407 can also be a polarization camera which measures polarization image of the environment. The spectacle 400 further includes a microphone 409 that is communicatively connected to a computer; the microphone captures sounds (e.g., the user's voice), and converts the captured acoustic signals into electrical signals that are processed by the computer to determine an input based on the captured sound (e.g., user's voice commands) to control the eigenpolarization state of the eyewear. The power supply (not shown) can be a battery. Example voice commands are as follows: (1) rotate right polarizer 5 degrees counterclockwise and the waveplate 10 degrees clockwise, (2) maximize contrast of what I am seeing every 5 seconds, (3) minimize reflection of the window in front of me, (4) maximize transmission, (5) right circular polarizer, (6) set DoCP to be 0.5 and rotate linear polarizer to horizon and (7) reduce glare from the sun. The computer, which is also communicatively connected to the polarization sensitive light detector 407, processes the polarization information of the environment using information obtained from polarization sensitive light detector 407, interprets the input commands from the user, calculates the eigenpolarization state (s), and rotates the filters to achieve the calculated eigenpolarization state.

Figure 5:
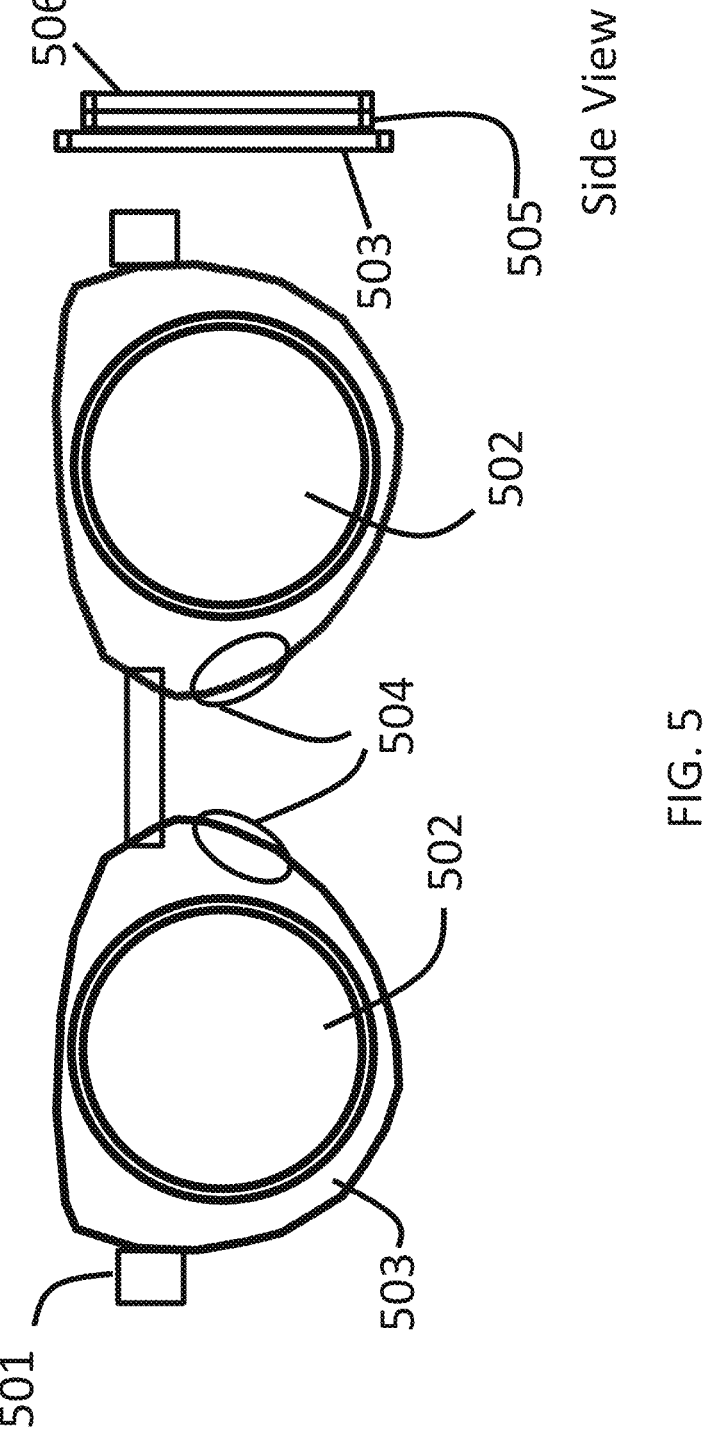
FIG. 5 illustrates yet another example embodiment of the disclosed technology that incorporates a tunable full Stokes polarization eyewear.

FIG. 5 illustrates yet another example embodiment of the disclosed technology that incorporates a tunable full Stokes polarization eyewear. The spectacle 500 includes a frame 501 connected to two nose pads 504. For each eye, the spectacle includes two filters 502 and 503 (reference numbers are provided for only the left side). The filters 502 and 503 can be mounted on the frame 501, and filter 502 can be rotated mechanically by hand to any arbitrary angle. In some example embodiments, the filter 503 is a neutral density filter or color filter that is fixed in position. For each eye, the filter 502 includes two filter layers, 505 and 506 (shown in the side-view illustration), which can be rotated independent of each other. For example, filter layer 505 can be an achromatic quarter waveplate and filter layer 506 can be a broadband linear polarizer that covers the visible spectrum. The configuration of FIG. 5 can be suitably adapted to provide the disclosed polarization tunability for prescription eyeglasses, where filter 503 provides, or is positioned on the optical surface that provides, the corrective capability.

Figure 6:
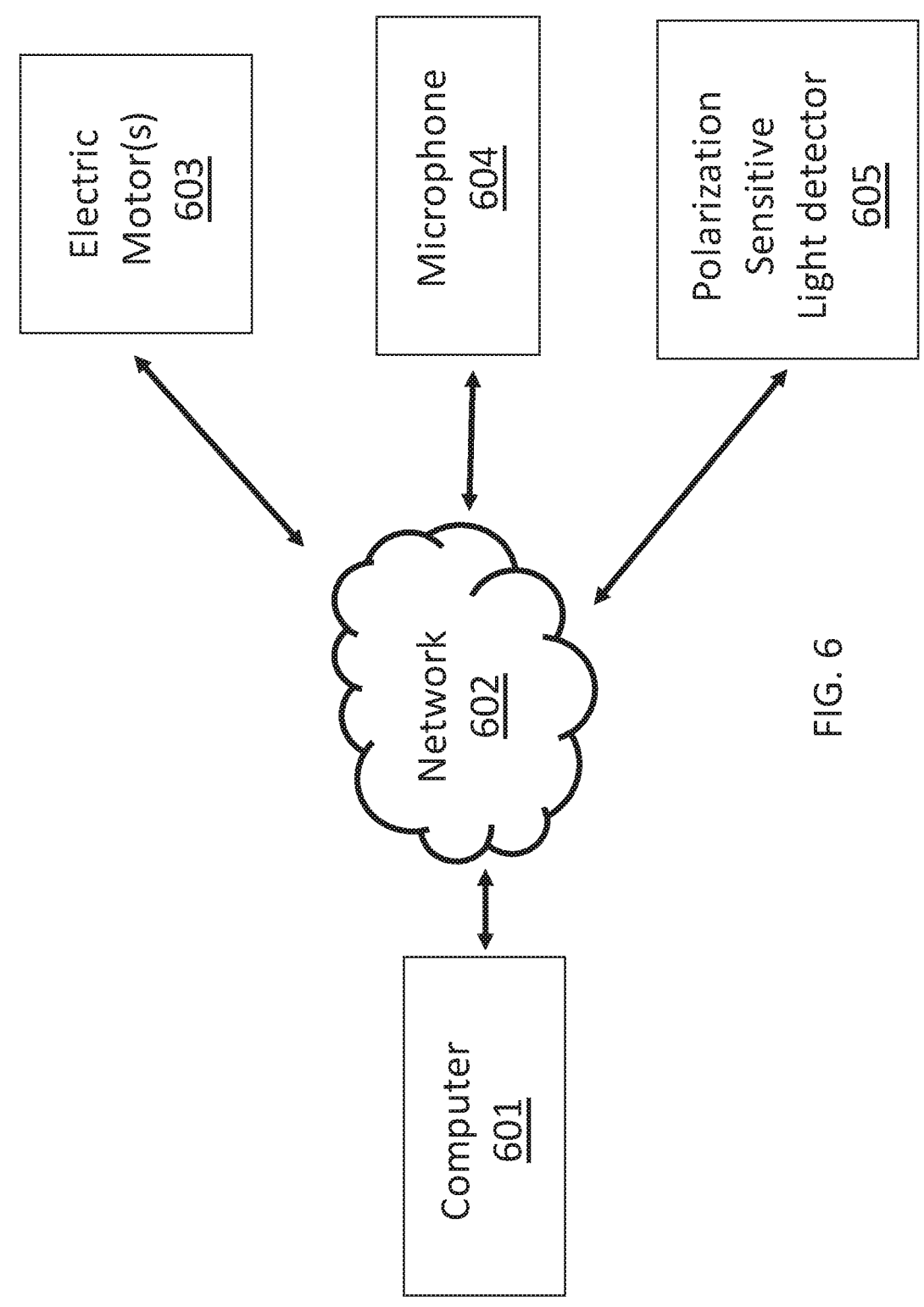
FIG. 6 is a block diagram that illustrates various components that can be used in the configuration of FIG. 5.

FIG. 6 illustrates a block diagram that illustrates various components of the configuration of FIG. 5. The electric motor(s) 603, the microphone 604, and the polarization sensitive light detector 605 are each communicatively connected to the computer 601 via network 602, which can be a wired or wireless communication channel. In some embodiments, the signals produced by the microphone 604, and the polarization sensitive light detector 605 are transmitted to the computer 601 without substantial processing (e.g., other than analog-to-digital conversion, or some basic processing), and the computer 601 includes the capability to receive, process, identify and generate appropriate signals for transmission to the electric motor(s) 603 based on the received signals. For example, the computer 601 may be part of a cloud computing structure, or a remote processing device. In some embodiments, some or all of the functionality of the computer 601 may be incorporated into the microphone 604 and/or the polarization sensitive light detector 605 to allow partial or even full processing and analysis of the received signals. In yet other embodiments, the computer 601 may be a separate component that is implemented locally as part of the eyewear. In yet another embodiments, the computer 601 may be a mobile phone or a tablet.

The control of the adjustable eyewear can be done locally or remotely. In the remote case, the eyewear is connected to a wireless network and to a remote computer. Information such as voice and images are uploaded to the remote computer (or the cloud), analyzed by suitable algorithms (e.g., deep learning algorithms) and is then downloaded to the eyewear to set the desired Stokes parameters for the eigenpolarization.

It should be noted that in the example configurations disclosed herein, the same filter pair is used for both eyes. In some embodiments, the filter pair may be implemented for only one eye, while providing a conventional filter, or no filters at all, for the second eye. In some embodiments, different filter pairs may be provided for each eye to, for example, accommodate differences between the eyes, and/or to provide different viewing capabilities for each eye. The disclosed technology can be implemented as part of a telescope, a smart eyeglass or headset, or other viewing devices.

The disclosed embodiments, among other features and benefits, provide the ability to achieve any arbitrary eigenpolarization state, provide tunability of eigenpolarization states based on environmental inputs, enable tunability of eigenpolarization states based on user inputs, and further tunability of eigenpolarization state based on both environmental and user inputs. The disclosed embodiments find numerous applications that include providing improved viewing ability in different environmental conditions, such as under water, in haze or fog, in outdoor and indoor environments, and in day and night times. One example application relates to improving the viewing conditions for a driver of a vehicle by tuning the adjustable polarization filters to block the spurious light that is produced via reflections from, e.g., the wind shield.

As noted earlier, the tunability of the disclosed polarization filters further enables the use of the same spectacle for optimum viewing in different environmental conditions, and optimum viewing for different kinds of electronic displays (e.g., cell phones) that emit light having different polarization states.

The disclosed polarization filters can be positioned on eyewear using filter holder elements that allow rotatable positioning of the filters about an optical axis of the eyewear device. The filter can be positioned either permanently, or replaceably, on the spectacle or eyewear device. In some embodiments, thin film polarization filters can be produced at low cost and coated (or attached via adhesive) on appropriate substrates for placement on the eyewear.

Figure 7:
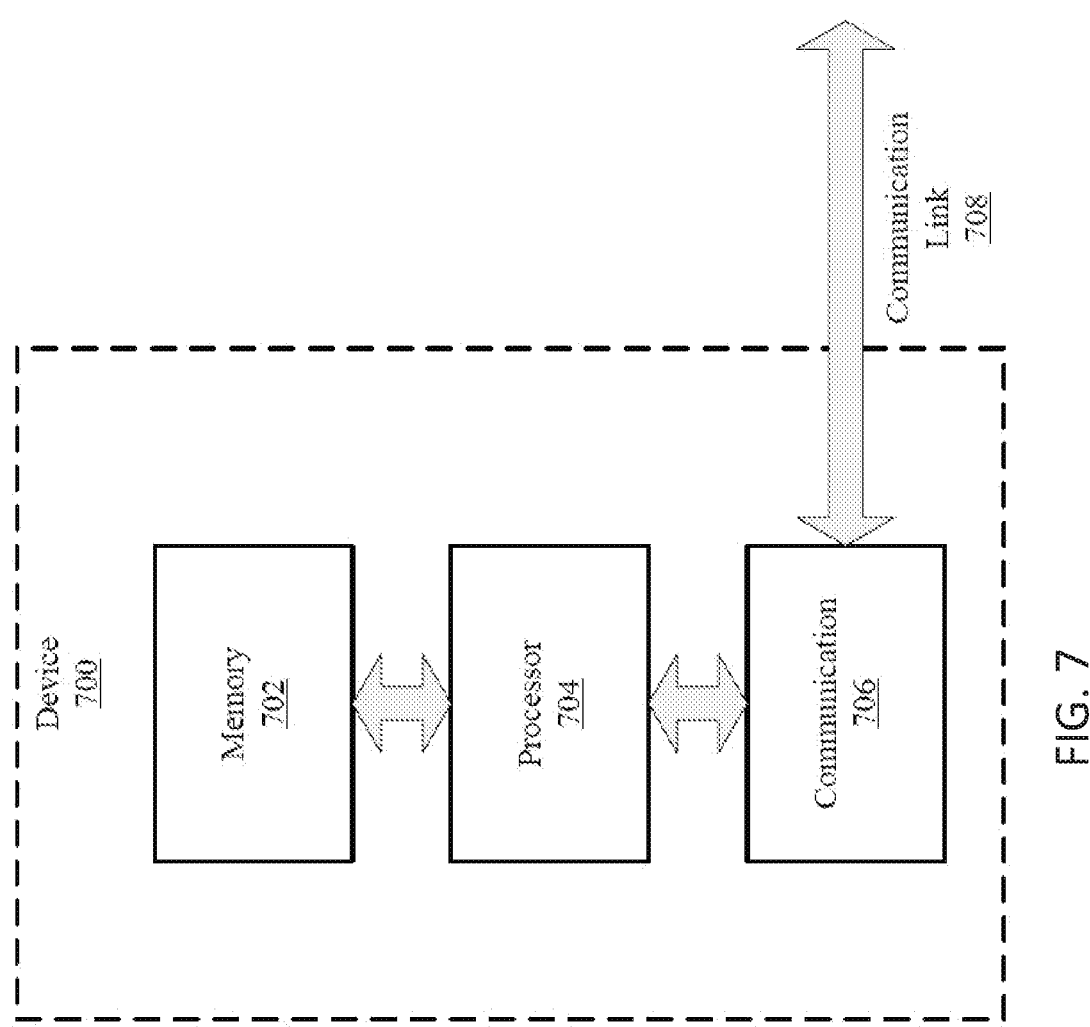
FIG. 7 illustrates a block diagram of a device that can be used to implement certain aspects of the disclosed technology.

FIG. 7 illustrates a block diagram of a device 700 that can be used to implement certain aspects of the disclosed technology. For example, the device of FIG. 7 can be used to receive, process, store, and provide for transmit various data and signals associated with disclosed microphones, polarization sensors, computers and other sensors. The device 700 comprises at least one processor 704 and/or controller, at least one memory 702 unit that is in communication with the processor 704, and at least one communication unit 706 that enables the exchange of data and information, directly or indirectly, through the communication link 708 with other entities, devices, databases and networks. The communication unit 706 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 700 of FIG. 7 may be integrated as part of larger component (e.g., a computer, tablet, smart phone, etc.), and/or may be incorporated in any of the components described herein, such as those in FIGS. 5 and 6.

The processor(s) 704 may include central processing units (CPUs) to control the overall operation of, for example, the host computer. In certain embodiments, the processor(s) 704 accomplish this by executing software or firmware stored in memory 702. The processor(s) 704 may be, or may include, one or more programmable general-purpose or special-purpose microprocessors, digital signal processors (DSPs), programmable controllers, application specific integrated circuits (ASICs), programmable logic devices (PLDs), graphics processing units (GPUs), artificial intelligence (AI) processors or the like, or a combination of such devices.

The memory 702 can be or can include the main memory of a computer system. The memory 702 represents any suitable form of random access memory (RAM), read-only memory (ROM), flash memory, or the like, or a combination of such devices. In use, the memory 702 may contain, among other things, a set of machine instructions which, when executed by processor 704, causes the processor 704 to perform operations to implement certain aspects of the presently disclosed technology.

FIG. 8 illustrates a set of operations 800 that can be carried out or improved viewing of an object in accordance with an example embodiment. At 802, a viewing device is obtained that includes an adjustable polarization filter assembly. The adjustable polarization filter assembly includes a first rotatable polarization filter configured to rotate around an optical axis of the viewing device, where the first rotatable polarization filter is configured to change a polarization of light that is incident thereupon. The adjustable polarization filter assembly also includes a second rotatable polarization filter configured to rotate around the optical axis of the eyewear device and positioned to receive light that passes through the first rotatable polarization filter and to modify a polarization of light that is incident thereupon. At least one of the first or the second rotatable polarization filters is an achromatic polarization retarder, and each of the first and the second rotatable polarization filters is rotatable independent of the other rotatable polarization filter such that the first and the second polarization filters together, via rotation of the first and the second rotatable polarization filters, is configurable to block any one of a plurality of eigenpolarization states on a Poincaré sphere and to transmit therethrough light having an orthogonal polarization state compared to the eigenpolarization state that is blocked.

Referring back to FIG. 8, at 804, the operations include rotating both the first and a second rotatable polarization filters together to obtain a first improved view of the object. At 806, only the second rotatable polarization filter is rotated to obtain a second improved view of the object, where the first improved view has a higher contrast compared to a view prior to rotating the first and the second filters together, and the second improved view has a higher contrast compared to the first improved view.

In one example embodiment, the operations further include receiving a voice command at the viewing device, where the viewing device includes a microphone and a processor configured to receive and process electrical signals from the microphone, generating one or more signals by the processor for rotation of one or both of the rotatable polarization filters, and rotating one or both of the rotatable polarization filters using an electric motor in response to the one or more signals.

In another example embodiment, the voice command includes a set of sequential commands for rotating the first and the second rotatable polarization filters in a particular order. In yet another example embodiment, the voice command includes a set of commands for rotating the first or the second rotatable polarization filters by a specified number of degrees.

One aspect of the disclosed technology relates to an adjustable polarization filter assembly for use in an eyewear device that was described in connection with operation 802 of FIG. 8. In one example embodiment of the adjustable polarization filter assembly, the first and the second rotatable polarization filters together, via rotation of the first and the second rotatable polarization filters, are configurable to block or transmit any eigenpolarization state on the Poincaré sphere. In another example embodiment, the first rotatable polarization filter is a quarter waveplate, and the second rotatable polarization filter is a linear polarizer. In yet another example embodiment, the adjustable polarization filter assembly includes a third filter positioned to receive light after passing through the second rotatable polarization filter, wherein the third filter is not rotatable. In still another example embodiment, the first rotatable polarization filter is a quarter waveplate, the second rotatable polarization filter is half waveplate and the third filter is a linear polarizer.

According to another example embodiment, the adjustable polarization filter assembly includes a third filter positioned to receive light prior to reaching the first filter, wherein the third filter is not rotatable. In one example embodiment, the first rotatable polarization filter is a quarter waveplate, the second rotatable polarization filter is half waveplate and the third filter is a neutral density filter or a color filter.

In another example embodiment, the filter assembly is incorporated as part of a system that includes the eyewear device, where the system further includes a polarization sensitive light detector positioned to receive ambient light to enable a determination of a polarization characteristic of the ambient light, one or more electric motors configured to rotate the first and the second rotatable polarization filters of the filter assembly, and a processor coupled to a memory having instruction stored thereon, the instructions upon execution by the processor enabling communications among the polarization sensitive light detector, the one or more electric motors and the processor. In one example embodiment, the one or more electric motors are configured to rotate in response to receiving a signal or a command from the processor. In another example embodiment, the processor is configured to receive polarization information associated with the ambient light from the polarization sensitive light detector and to issue a command or a signal to the one or more electric motors to rotate the first or the second rotatable polarization filter based on the polarization information associated with the ambient light.

In still another example embodiment, the system further includes a microphone positioned to receive sounds from a surrounding environment and to provide electrical signals associated therewith to the processor. In yet another example embodiment, the microphone is positioned to capture a voice of a user, and the processor is configured to process the electrical signals associated with the voice to extract information associated with the voice, and to transmit one or more commands to the one or more electric motors to rotate the first and the second rotatable polarization filters based on the information associated with the voice. In one example embodiment, the information associated with the voice includes one or more of: a degree and direction of rotation of the first or the second rotatable polarization filter, a request to maximize contrast of an image of an object that is being viewed, a request to minimize a reflection of unwanted light that is received by the eyewear device, or a request to maximize transmission of light through the combination of the first and the second rotatable polarization filters.

According to another example embodiment, the polarization sensitive light detector is a point detector that is configured to measure an average value of a Stokes parameter associated with the ambient light. In one example embodiment, the polarization sensitive light detector is a polarization camera that is configured to measure a polarization image of an environment that includes the ambient light. In yet another example embodiment, the first and the second rotatable polarization filters are manually rotatable.

In another example embodiment, the first and the second rotatable polarization filters form a first filter set configured for placement in front of a first eye, and the adjustable polarization filter assembly further includes a second filter set configured for placement in front of a second eye, where the first and the second filter sets each enable adjustments for blockage or transmission of polarized light independently for each eye. In still another example embodiment, the first and the second rotatable polarization filters are thin film filters. In another example embodiment, the eyewear device includes prescription glasses positioned on one side of the adjustable polarization filter assembly.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Aspects of the subject matter described in this specification can be implemented as one or more computer program products, e.g., one or more modules of computer program instructions encoded on a tangible and non-transitory computer readable medium for execution by, or to control the operation of, data processing apparatus. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. An adjustable polarization filter assembly for use in an eyewear device, comprising:
   a first rotatable polarization filter configured to rotate around an optical axis of the eyewear device, the first rotatable polarization filter configured to change a polarization of light that is incident thereupon; and
   a second rotatable polarization filter configured to rotate around the optical axis of the eyewear device and positioned to receive light that passes through the first rotatable polarization filter and to modify a polarization of light that is incident thereupon, wherein
   at least one of the first or the second rotatable polarization filters is an achromatic polarization retarder, and
   each of the first and the second rotatable polarization filters is rotatable independently from one another such that the first and the second polarization filters together, via rotation of the first and the second rotatable polarization filters, is configurable to block any one of a plurality of eigenpolarization states on a Poincaré sphere and to transmit therethrough light having an orthogonal polarization state compared to the eigenpolarization state that is blocked, wherein:
   the eyewear device includes a microphone configured to receive a voice command at the eyewear device and a processor configured to receive and process electrical signals from the microphone, the processor is configured to generate one or more signals to rotate one or both of the first and the second rotatable polarization filters in response to the voice command using an electric motor.

2. The adjustable polarization filter assembly of claim 1, wherein the first and the second rotatable polarization filters together, via rotation of the first and the second rotatable polarization filters, are configurable to block or transmit any eigenpolarization state on the Poincaré sphere.

3. The adjustable polarization filter assembly of claim 1, wherein the first rotatable polarization filter is a quarter waveplate, and the second rotatable polarization filter is a linear polarizer.

4. The adjustable polarization filter assembly of claim 1, comprising a third filter positioned to receive light after passing through the second rotatable polarization filter, wherein the third filter is not rotatable.

5. The adjustable polarization filter assembly of claim 4, wherein the first rotatable polarization filter is a quarter waveplate, the second rotatable polarization filter is half waveplate and the third filter is a linear polarizer.

6. The adjustable polarization filter assembly of claim 1, further including a third filter positioned to receive light prior to reaching the first rotatable polarization filter, wherein the third filter is not rotatable.

7. The adjustable polarization filter assembly of claim 6, wherein the first rotatable polarization filter is a quarter waveplate, the second rotatable polarization filter is half waveplate and the third filter is a neutral density filter or a color filter.

8. The adjustable polarization filter assembly of claim 1, wherein the adjustable polarization filter assembly is incorporated as part of a system that includes the eyewear device, the system further including:

a polarization sensitive light detector positioned to receive ambient light to enable a determination of a polarization characteristic of the ambient light;

wherein the processor is coupled to a memory having instructions stored thereon, the instructions upon execution by the processor enabling communications among the polarization sensitive light detector, the electric motor and the processor.

9. The adjustable polarization filter assembly of claim 8, wherein the processor is configured to receive polarization information associated with the ambient light from the polarization sensitive light detector and to issue a command or a signal to the electric motor to rotate the first or the second rotatable polarization filter based on the polarization information associated with the ambient light.

10. The adjustable polarization filter assembly of claim 8, wherein the microphone is positioned to receive sounds from a surrounding environment.

11. The adjustable polarization filter assembly of claim 10, wherein the microphone is positioned to capture the voice command as a voice of a user, and the processor is configured to:

process the electrical signals associated with the voice of the user to extract information associated with the voice of the user, and transmit one or more commands to the electric motor to rotate the first and the second rotatable polarization filters based on the information associated with the voice of the user.

12. The adjustable polarization filter assembly of claim 11, wherein the information associated with the voice of the user includes one or more of:

a degree and direction of rotation of the first or the second rotatable polarization filter;

a request to maximize contrast of an image of an object that is being viewed;

a request to minimize a reflection of unwanted light that is received by the eyewear device; or a request to maximize transmission of light through a combination of the first and the second rotatable polarization filters.

13. The adjustable polarization filter assembly of claim 8, wherein the polarization sensitive light detector is a point detector that is configured to measure an average value of a Stokes parameter associated with the ambient light.

14. The adjustable polarization filter assembly of claim 8, wherein the polarization sensitive light detector is a polarization camera that is configured to measure a polarization image of an environment that includes the ambient light.

15. The adjustable polarization filter assembly of claim 8, wherein the eyewear device includes prescription glasses positioned on one side of the adjustable polarization filter assembly.

16. The adjustable polarization filter assembly of claim 1, wherein the first and the second rotatable polarization filters are manually rotatable.

17. The adjustable polarization filter assembly of claim 1, wherein the first and the second rotatable polarization filters form a first filter set configured for placement in front of a first eye, and the adjustable polarization filter assembly further includes a second filter set configured for placement in front of a second eye, the first and the second filter sets each enabling adjustments for blockage or transmission of polarized light independently for each eye.

18. The adjustable polarization filter assembly of claim 1, wherein the first and the second rotatable polarization filters are thin film filters.

19. A method of for improved viewing of an object, the method comprising:

obtaining a viewing device that includes an adjustable polarization filter assembly comprising:

a first rotatable polarization filter configured to rotate around an optical axis of the viewing device, the first rotatable polarization filter configured to change a polarization of light that is incident thereupon; and a second rotatable polarization filter configured to rotate around the optical axis of the viewing device and positioned to receive light that passes through the first rotatable polarization filter and to modify a polarization of light that is incident thereupon, wherein at least one of the first or the second rotatable polarization filters is an achromatic polarization retarder, and each of the first and the second rotatable polarization filters is rotatable independently of one another such that the first and the second polarization filters together, via rotation of the first and the second rotatable polarization filters, is configurable to block any one of a plurality of eigenpolarization states on a Poincaré sphere and to transmit therethrough light having an orthogonal polarization state compared to the eigenpolarization state that is blocked;

rotating both the first and the second rotatable polarization filters together to obtain a first improved view of the object, rotating only the second rotatable polarization filter to obtain a second improved view of the object, wherein the first improved view has a higher contrast compared to a view prior to rotating the first and the second rotatable polarization filters together, and the second improved view has a higher contrast compared to the first improved view, receiving a voice command at the viewing device, wherein the viewing device includes a microphone and a processor configured to receive and process electrical signals from the microphone, generating one or more signals by the processor for rotation of one or both of the rotatable polarization filters in response to the voice command, and rotating one or both of the rotatable polarization filters using an electric motor in response to the one or more signals produced.

20. The method of claim 19, wherein the voice command includes a set of sequential commands for rotating the first and the second rotatable polarization filters in a particular order.

21. The method of claim 19, wherein the voice command includes a set of commands for rotating the first or the second rotatable polarization filters by a specified number of degrees.

* * * * *